United States Patent [19]

Studer

[11] Patent Number: 4,634,191

[45] Date of Patent: Jan. 6, 1987

[54] RADIAL AND TORSIONALLY CONTROLLED MAGNETIC BEARING

[75] Inventor: Philip A. Studer, Silver Spring, Md.

[73] Assignee: The United States of America as represented by the Administrator of the National Aeronautics & Space Administration, Washington, D.C.

[21] Appl. No.: 800,193

[22] Filed: Nov. 21, 1985

[51] Int. Cl.$^4$ .............................................. F16C 39/06
[52] U.S. Cl. ................................................... 310/90.5
[58] Field of Search ................... 308/10; 361/143, 146

[56] References Cited

U.S. PATENT DOCUMENTS

| | | | |
|---|---|---|---|
| 3,694,041 | 9/1972 | Studer | 308/10 |
| 3,845,995 | 11/1974 | Wehde | 308/10 |
| 3,976,339 | 8/1976 | Sabnis | 308/10 |
| 4,000,929 | 1/1977 | Studer | 308/10 |
| 4,483,570 | 11/1984 | Inoue | 308/10 |

Primary Examiner—R. Skudy

Attorney, Agent, or Firm—John O. Tresansky; John R. Manning; Harry Lupuloff

[57] ABSTRACT

A magnetic bearing including a circular stator member having a plurality of circumferential pole faces and a suspended annular ring member with corresponding number of inward facing circumferential pole faces separated by respective air gaps. A source of DC magnetic flux circulates flux between the circumferential pole faces of the stator and the ring to provide axial stability along a central longitudinal axis. Flux coil means are included on the stator member for providing variable flux density along predetermined radial paths to provide active radial stabilization. Additionally, flux coil means are included on the stator to actively modulate the magnitude of the magnetic forces as well as their direction of differential flux control involving the DC magnetic flux to produce torquing moments about a pair of mutually orthogonal axes which are perpendicular to the central axis.

20 Claims, 7 Drawing Figures

RADIAL AND TORSIONALLY CONTROLLED MAGNETIC BEARING

ORIGIN OF THE INVENTION

The invention described herein was made by an employee of the U.S. Government and may be manufactured and used by or for the Government for government purposes without the payment of any royalties thereon or therefor.

TECHNICAL FIELD

The invention relates generally to magnetic bearings and more particularly to an active bearing providing controllable torques in multiple degrees of freedom as well as controlled radial stability.

BACKGROUND ART

This invention has particular utility in providing a means for supporting and controlling the position and angular orientation of an object without physical contact to eliminate wear or frictional effects. The uses of such a suspension and control system most obviously apply to high speed rotating devices but also has applicability to robotic joints and the support of optical elements. In the latter case, precision of positioning and orientation control are the demanding requirements.

Conventional mechanical bearings have known limitations of life, need for lubrication, and performance limitations due to non-linear frictional characteristics. Gas bearing technology is not applicable in applications where the frictional drag of the gas provides unacceptable power losses or where the availability of suitable purified pressure gas supply is questionable. This has led to magnetic suspension systems, commonly referred to as magnetic bearings.

Known prior art magnetic bearings emphasize the simplicity of construction and operation and are generally restricted to single orientation systems which allow the use of passive methods for restraint in some degrees of freedom. Passive methods are typically less precise and fixed by design and therefore less versatile and inherently limited as to their applicability. This then led to the development of active magnetic bearings, a typical example being that shown and described in applicant's own prior art patent, namely U.S. Pat. No. 4,000,929, entitled, "Magnetic Bearing System", which issued on Jan. 4, 1977, the details of which are herein meant to be incorporated by reference.

As disclosed in U.S. Pat. No. 4,000,929, a single magnetic radial bearing comprising a circular disc type stator structure, including a magnetic circuit, supports a metallic annular ring in a plane at right angles to the longitudinal axis of the disc, which axis is coincident with the z axis of the bearing, by arranging the pole faces of the disc and the ring so that they are mutually opposing and maximum permeance exists in the air gap between the disc and the ring. A first magnetic flux circuit extends 90° in each direction around the annular ring whereby flux entering the ring along one radial path splits into and traverses to opposite paths and returns to the stator along diametrically opposite paths. A pair of such magnetic circuits are provided on the stator to actively position the stator and ring radially in a plane at right angles to the z axis. The stator and ring remain stabilized in the z axis direction because of the tendency of the bodies to be aligned through an air gap of maximum permeance which exists when the stator and the ring pole faces are aligned. The structure provided thereby provides a completely stable self-contained support having multiple degrees of restrained freedom, allowing free or controlled rotation of the ring in a single axis in a flat wheel-like volume. Control of the radial position of the ring is obtained by superimposing variable vernier fluxes on steady state (DC) fluxes that extend from the stator through the air gap to the ring. The magnetic fluxes extend through the air gap along diametrically opposed paths of the stator and ring. The vernier flux is furthermore arranged so that it aids and opposes the DC fluxes in the air gap on diametrically opposed sides of the bearing. A sensor for the radial position between the stator and ring is provided to control the vernier flux so that the radial forces between the interior and exterior members remain the same, i.e. the sum of the magnetic and external forces between the members remain constant regardless of its orientation. The annular ring typically comprises the rotor of a motor which rotates about the z axis.

It is an object of this invention to provide a means for supporting and controlling the position and angular orientation of an object without physical contact therebetween.

It is another object of this invention to provide a new and improved magnetic bearing.

It is a further object of this invention to provide a new and improved active magnetic bearing for adjusting or otherwise accurately controlling the angular orientation as well as radial position of a suspended member in the presence of static and/or dynamic disturbances.

It is still another object of this invention to provide an active magnetic bearing for producing torsioning moments on a suspended member about a pair of orthogonal axes.

STATEMENT OF THE INVENTION

The foregoing and other objects of the invention are achieved by a stator member having a plurality of outwardly facing circumferential pole faces and a suspended rotatable circular ring member which also includes the same number of inwardly facing pole faces which oppose respective pole faces of the stator element. A constant or DC source of magnetic flux is generated which circulates between the mutually opposing circumferential pole faces and the body portions of the stator member and ring member to provide passive stabilization along a central longitudinal z axis. Magnetic circuit means are furthermore included on the stator member for not only providing variable flux densities along radial paths in a plane including orthogonal x and y axes which are perpendicular to the z axis to provide active radial stabilization, but also to modulate the flux and directions of the resulting magnetic forces to produce selectively commanded torquing moments of the ring member about both the x and y axes.

In the preferred embodiment, the stator member is comprised of a central circular ferrous disc sandwiched between a pair of circular permanent disc magnets which are oriented in magnetic opposition to one another. On the outer faces of the permanent magnets are upper and lower sets of slightly separated ferrous disc segments in the form of quadrants whose vertices intersect at the z axis. Each quadrant is wound with flux generating coils such that magnetic flux flowing diametrically in the x and y axis directions can be generated and selectively modulated. When the upper and lower coils are energized to provide magnetic flux in the same direction with the flux returning through a central gap between the stator and rotor, radial forces are produced. When the upper and lower coils are energized in opposition, however, differential forces are produced which selectively generate torques about x and y axes, thus providing a controlled limited angular or torsional movement defining a cone about the z axis.

DETAILED DESCRIPTION OF THE DRAWINGS

Figure 1:
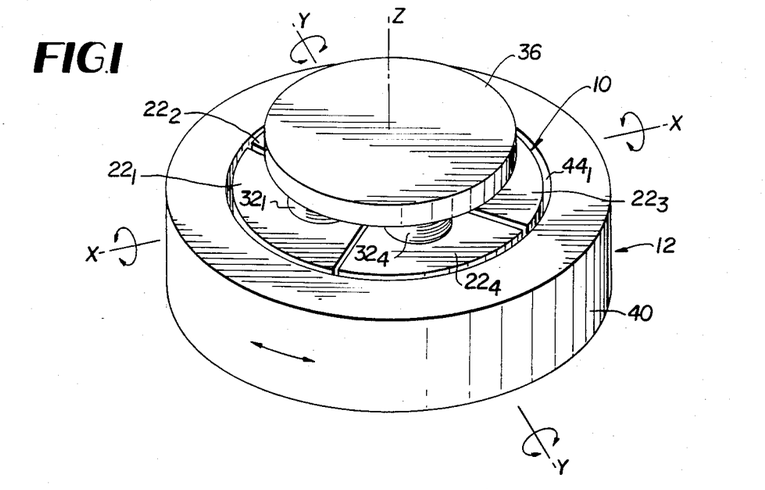
FIG. 1 is a perspective view generally illustrative of a first embodiment of a magnetic bearing structure in accordance with the present invention.

With reference to the drawings wherein like reference numerals refer to like components throughout this specification, FIG. 1 discloses a single radial magnetic bearing which is shown comprised of an inner stationary member 10, referred to hereinafter as the stator, which magnetically supports an outer annular ring member 12 which commonly comprises a rotating member such as the rotor of a DC motor, not shown. The stator 10 and the ring 12 have a common central longitudinal axis which is coincident with an axis defined as the z axis and are thus coaxial. Further as shown in FIG. 1, a pair of mutually orthogonal x and y axes define a plane through the stator 10 and the ring 12 which is perpendicular to the z axis. There is no mechanical connection between members 10 and 12 and they are positioned relative to each other solely by the magnetic forces developed across the circumferential air gap between them.

As taught in the known prior art, for example in U.S. Pat. No. 4,000,929, controlled radial movement between stator 10 and the ring 12 along the x and y axes is actively provided by variable magnetic fields generated between the two members while axial movement along the z axis as well as rotational movement about either the x or y axes are passively restrained. The present invention, on the other hand, has for its purpose active control of the rotational movement of the ring 12 about the x and y axes as well as radial centering thereof.

Figure 2:
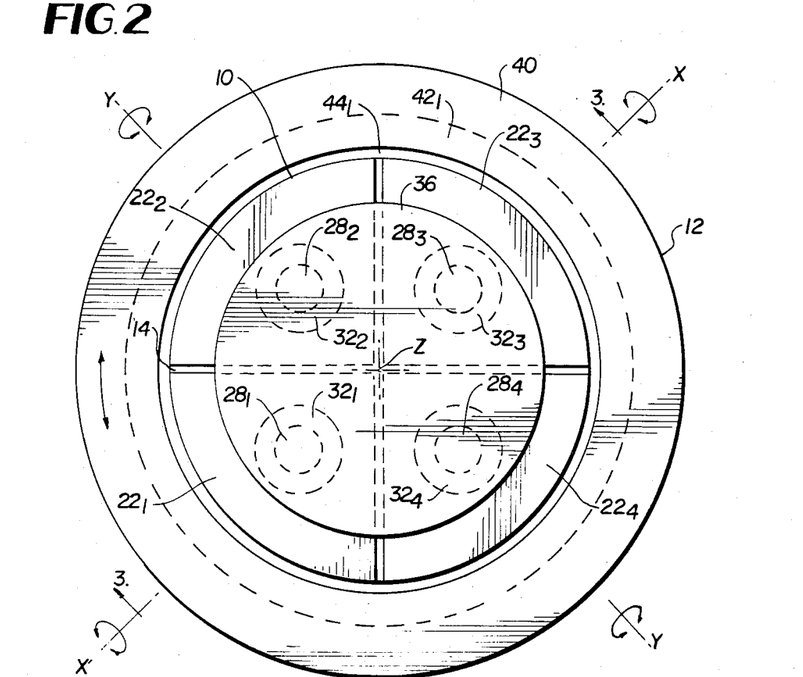
FIG. 2 is a top planar view of the embodiment shown in FIG. 1.
Figure 3:
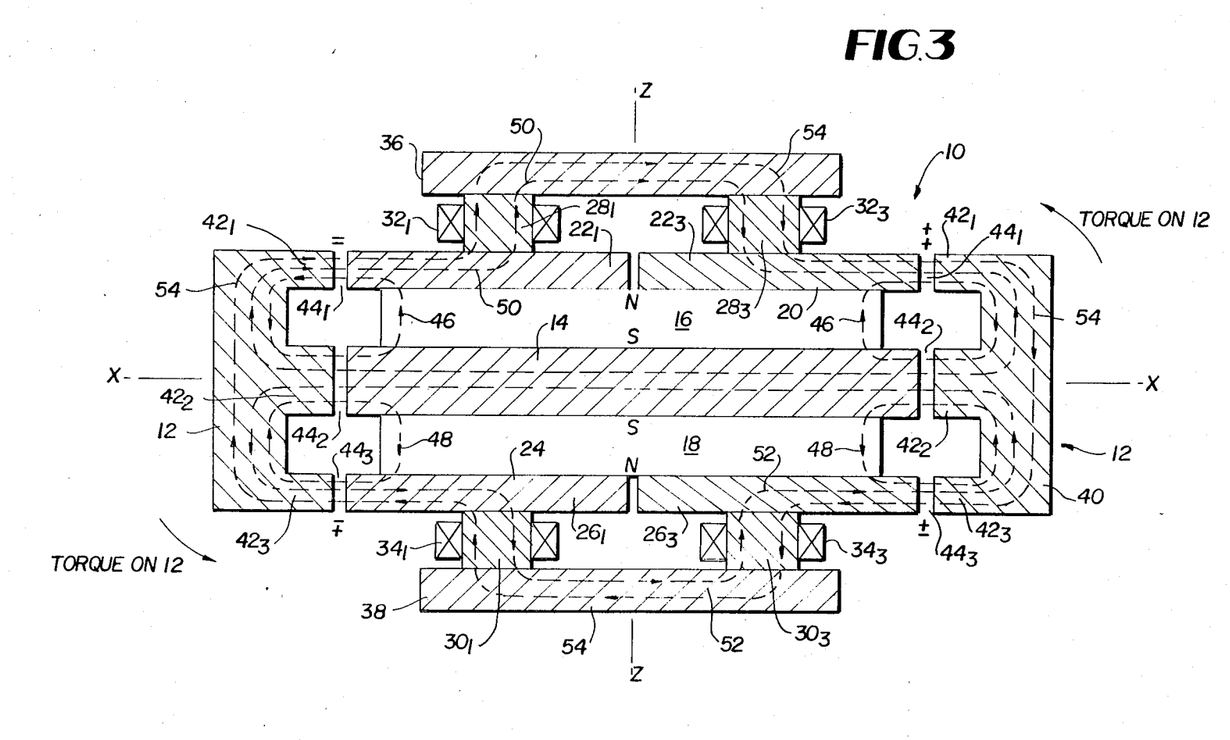
FIG. 3 is a cross sectional view of the embodiment shown in FIGS. 1 and 2 taken along the lines 3—3 of FIG. 2.

Referring now additionally to FIGS. 2 and 3, the first embodiment of the invention is comprised of a symmetrical structure including an innermost circular magnetically permeable ferrous disc 14 (FIG. 3) which is centered about the "z" axis and which is sandwiched between a pair of disc type permanent magnets 16 and 18. The permanent magnets 16 and 18 are furthermore oriented so that their polarities are mutually opposed.

As shown, the (S) poles are facing one another; however, when desirable, their polarities can be reversed. The centers of the magnets 16 and 18 are also coincident with the z axis. On the outer face 29 of the upper permanent magnet 16 there is located a circular magnetically permeable ferrous disc configuration comprised of four quadrant disc segments $22_1$, $22_2$, $22_3$ and $22_4$ as shown in FIG. 2 whose vertices lie at the z axis. In a like manner, on the outer face 24 of the lower permanent magnet 18 there is located a second set of identical ferrous disc quadrants $26_1$–$26_4$, two of which are shown in FIG. 3 by reference numerals $26_1$ and $26_3$. The quadrants $22_1$, $22_2$ ... $22_4$ as well as the quadrants $26_1$, $26_2$ ... $26_4$ are in mutual registration with one another such that quadrant $22_1$, for example, is located opposite and above quadrant $26_1$, etc. and are aligned with the x and y axes.

Each of the ferrous quadrants $22_1$–$22_4$ and $26_1$–$26_4$ located on the outer surface of the permanent magnets 16 and 18 furthermore include outwardly projecting cylindrical ferrous body portions $28_1$–$28_4$ (FIG. 2) and $30_1$–$30_4$ which act as core members for upper and lower sets of flux producing coil windings. The upper core members $28_1$–$28_4$ (FIG. 3) are wound with respective flux coils $32_1$–$32_4$ shown in the plan view of FIG. 2, while a second set of four flux coils $34_1$–$34_4$ are wound on the lower core members $30_1$–$30_4$, two of which are shown in FIG. 3, i.e. $34_1$ and $34_3$. Finally, the stator includes a pair of outer ferrous discs 36 and 38 of relatively smaller diameter which are in contact with the core members $28_1$–$28_4$ and $30_1$–$30_4$, respectively, and operate as flux return paths or flux bridges between diametrically located disc quadrants, for example $21_1$ and $21_3$, as will be explained subsequently.

The annular ring 12 as shown in FIG. 3 comprises a solid magnetically permeable body 40 having three inwardly projecting rims $42_1$, $42_2$ and $42_3$ which terminate in surface edges which define pole faces for three air gaps $44_1$, $44_2$ and $44_3$ which oppose the outer circular surface edges of the upper and lower ferrous disc segments $22_1$–$22_4$ and $26_4$ as well as the outer edge of the innermost ferrous disc 14.

In the configuration shown in FIGS. 2 and 3, the permanent magnet discs 16 and 18 generate upper and lower DC flux paths having opposite flow directions shown diagrammatically by reference numerals 46 and 48 which pass through the two outer circumferential air gaps $44_1$ and $44_3$, respectively, while returning through the common central circumferential air gap $44_2$. The upper and lower sets of flux coils $32_1$–$32_4$ and $34_1$–$34_4$ are operated in diametrically opposite pairs such that coil $32_1$ is operated in combination with coil $32_3$ to produce flux in one axial direction, i.e. along the x axis, while coils $32_2$ and $32_4$ are operated in combination to produce flux along the y axis. In a like manner, lower coils $34_1$ and $34_3$ operate to produce flux in the x axis direction while coils $34_2$ and $34_4$, not shown, produce flux in the y axis direction.

The flux coils $32_1$–$32_4$ and $34_1$–$34_4$ of FIG. 3 operate to produce both radial forces and torque producing forces depending on the manner in which they are energized. If, for example, the upper and lower flux coils are energized in the same direction to provide magnetic flux which circulates as shown by flux paths 50 and 52 and which returns in the same direction through the central gap $44_2$ and the middle disc member 14 as shown, then radial forces are produced. However, if the upper and lower flux coils are energized in opposition to generate magnetic flux which circulates as shown by the outer flux path 54 which traverses the gaps $44_1$ and $44_3$ while being cancelled through the flux path including the central gap $44_2$, then torsional forces are produced. These forces are, moreover, shown by the + and − signs located at the air gaps which indicate whether the respective flux aids (+) or opposes (−) the permanent magnet flux of flux paths 46 and 48. As indicated by the inner + or − sign, the radial force flux 50 and 52 aids (+) the permanent magnet flux 46 and 48, respectively, on the right while opposing (−) it on the left, thus producing a radial force on the ring to the left on the x axis. Insofar as the torque producing flux indicated by the path 50 is concerned, it aids (+) the permanent magnet flux 46 and 48 in the upper right and lower left hand corners as indicated by the outer + or − sign while being opposed (−) thereby in the lower right and upper left hand corners, thus producing a counterclockwise torque on the ring 12 about the y axis. A flux reversal would produce a torque in the clockwise direction. These forces can be generated by suitable control of the same flux coils so that by selective connection of the windings through switching controlled by a microprocessor, for example, not shown, both radial and torque producing forces can be produced virtually simultaneously.

The magnetic forces in the upper and lower air gaps $44_1$ and $44_3$ can be modified by design changes of the width and angle of the pole faces, which concept is taught in U.S. Pat. No. 4,000,929, and also by means of the change in magnetic reluctance vs. angle which is dependent on the materials and geometry. What is significant with respect to the embodiment shown in FIGS. 1 through 3 is that the symmetry of shape permits the production of force couples acting at the effective radius of the air gap to produce torques individually about both the x and y axes while being centered on the z axis.

Figure 4:
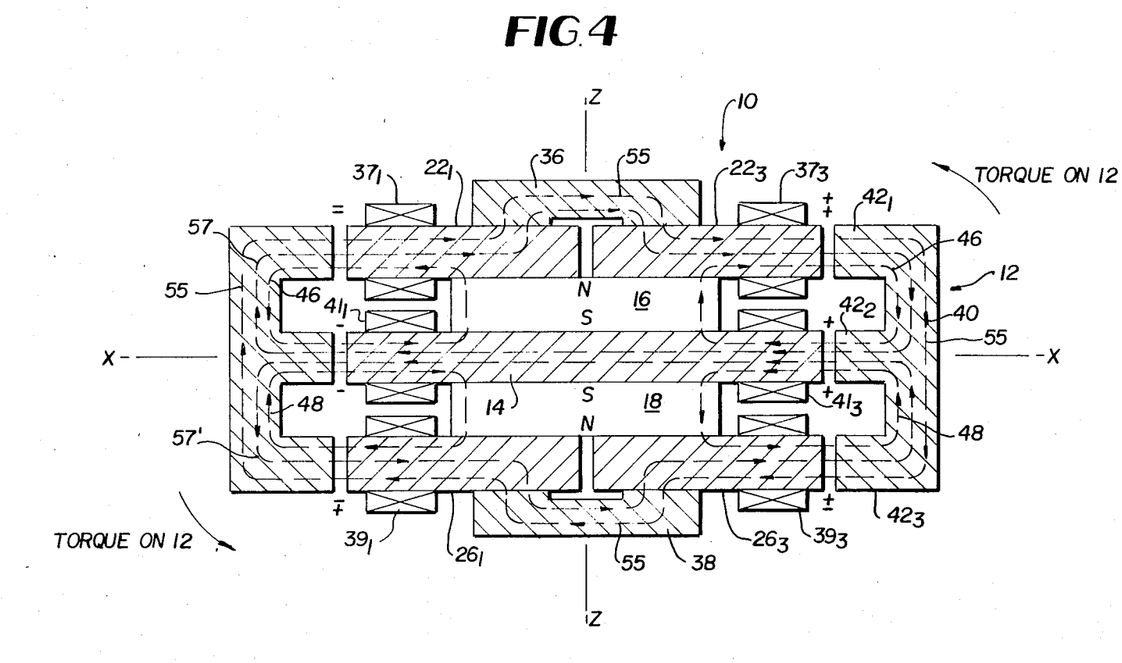
FIG. 4 is a cross sectional view of a second embodiment of the invention taken along its x axis.

A second embodiment of the invention which affords a relatively simple control is shown in FIG. 4. This structure also includes an annular ring 12 identical to that shown in FIGS. 1 through 3 wherein three inner facing rims $42_1$, $42_2$ and $42_3$ are provided which terminate in pole faces which oppose outer edges of an upper set of ferrous disc quadrants $22_1$-$22_4$, the middle disc 14 and a lower set of ferrous disc quadrants $26_1$-$26_4$. As in the first embodiment, a central ferrous disc 14 is located between a pair of permanent magnets 16 and 18 which are also in the form of discs. In this embodiment, however, an upper set of torque producing flux coils $37_1$-$37_4$ and a lower set of torque producing flux coils $39_1$-$39_4$ are respectively located on the periphery of the top and lower sets of disc segments $22_1$-$22_3$ and $26_1$-$26_4$ while a third set of flux coils $41_1$-$41_4$ are provided on the inner disc 14 which are specifically dedicated for producing radial forces on the annular ring. The permanent magnet discs 16 and 18 produce circulating flux as described by the flux paths 46 and 48 which passively provide axial forces for suspending the annular ring 12. The coils $41_1$ and $43_3$ are connected together to produce flux which circulates in the same direction through the upper and lower quadrant elements $22_1$, $22_3$ and $26_1$, $26_3$ through the flux bridges 36 and 38, across the outer air gaps $44_1$ and $44_2$ and back through the ferrous disc 14 as shown by the flux path 57 and 57' to provide radial control. The upper and lower sets of coils $37_1$-$37_3$ and $39_1$-$39_3$ are connected in opposition as in the first embodiment to generate a circulating flux throughout the periphery of the structure as shown by the flux path 55, whereupon it aids or opposes the permanent magnet flux to produce additive and subtractive torque producing forces depending upon the direction of excitation. In the embodiment shown in FIG. 4, a radial force to the left is produced for the flux directions as shown while a counterclockwise torque is produced. This is the same as illustrated with respect to that shown in FIG. 3.

Figure 5:
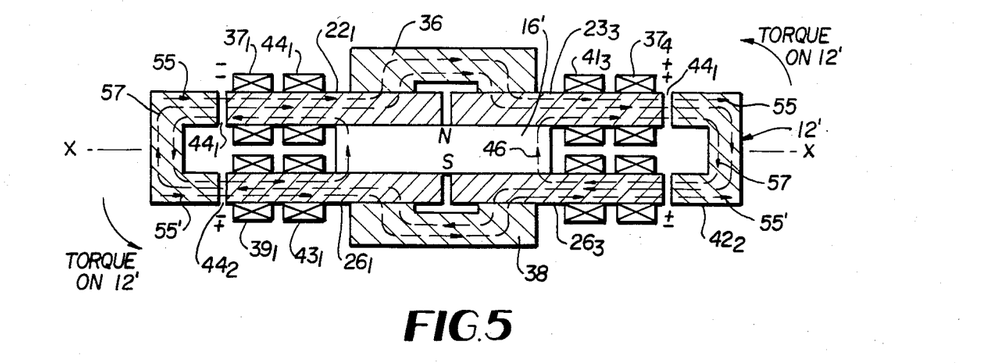
FIG. 5 is a cross sectional view of a third embodiment of the invention along its x axis.
Figure 6:
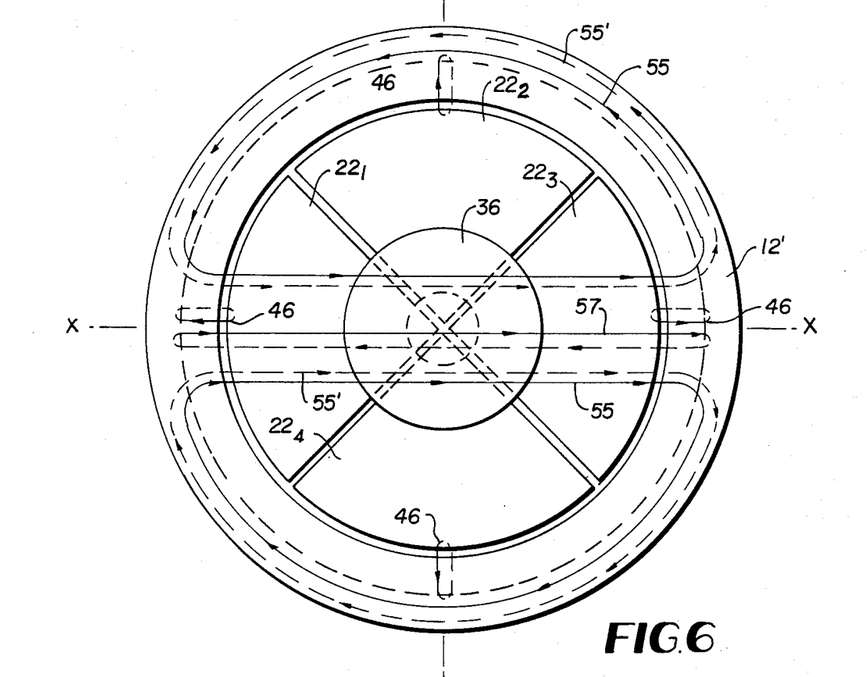
FIG. 6 a top planar view of the embodiment shown in FIG. 5.

While the first two embodiments are directed to structures including "three levels" of flux involving three air gaps $44_1$, $44_2$ and $44_3$, a third embodiment or "two level" embodiment of an active magnetic bearing for providing not only radial control of an annular ring, but also torquing moments is shown in FIGS. 5 and 6.

Referring now to FIG. 5, this embodiment includes a single source of DC magnetic flux, i.e. a permanent magnet disc 16' located between the upper and lower quadrant disc stator segments $22_1$-$22_4$ and $26_1$-$26_4$ of magnetically permeable material. The outer rims of the stator segments $22_1$-$22_4$ and $26_1$-$26_4$ oppose two inwardly projecting rims $42_1$ and $42_2$ of an annular ring 12' and terminate in surface edges which define opposing pole faces for only two air gaps $44_1$ and $44_2$. As in the embodiment of FIG. 4 which includes separate flux coils for producing radial and torque producing forces, the structure of FIG. 5 also includes separate flux coils. Accordingly, two sets of radial control coils $37_1$-$37_4$ and $39_1$-$39_4$ are located on the outer portion of the stator segments $22_1$-$22_4$ and $26_1$-$26_4$, respectively while upper and lower sets of torque producing coils $41_1$-$41_4$ and $43_1$-$43_4$ are located inwardly thereof. Upper and lower flux bridges 36 and 38 are also included to implement flux paths for flux flow between diametrically opposing stator segments.

FIG. 6 is intended to provide a further illustration of the flux paths for the "two level" structure shown in cross section in FIG. 5 and for this reason the flux coils are not shown in FIG. 6 for the sake of clarity. Referring now to both of these Figures, DC magnetic flux circulates in all directions outwardly as shown by flux path $46_1$ from the upper stator segments $22_1$-$22_4$ across circumferential air gap $44_1$ downwardly through the body of the ring 12', returning via air gap $44_2$ to the lower stator segments $26_1$-$26_4$.

Radial forces along the x axis are produced by energizing coils $37_1$ and $37_3$ together with coils $39_3$ and $39_1$ which causes controllable flux as shown by flux path 57 to circulate diametrically across upper stator segments $22_1$ and $22_3$, via the flux bridge 36, across air gap $44_1$ at the right downwardly through the ring 12', across lower air gap $44_2$ passing in the opposite direction diametrically in lower stator segments $26_3$ and $26_1$ via flux bridge 38, outwardly again across lower air gap $44_2$ up through ring 12' and returning again across air gap $44_1$. It will be noticed that on one side, i.e. the right side, the radial control flux 57 adds(+) to the permanent magnet flux 46 increasing the magnetic force between the stator and ring while in the two air gap crossings on the left side, the effect is to reduce (−) the total flux in the air gaps $44_1$ and $44_2$, thus producing a net force on the ring 12' in the x axis to the left.

Coil sets 41 and 43 are electrically connected so that coils $41_1$ and $41_3$, for example, produce a transverse diametrical flux as shown by flux path 55 in the upper portion of the stator while coils $43_1$ and $43_3$ which lie below coils $41_1$ and $41_3$ produce a diametrical flux as shown by flux path 55' in the same direction in the lower portion of the stator. In this embodiment, however, no permeable return paths for these fluxes 55 and 55' are provided on the stator but rather the circumferential continuity of annular ring 12' provides a high permeability path in the x-y plane as shown in FIG. 6. Current flowing in coils $41_1$ and $41_3$ causes a magnetic flux as indicated by 55 in segments $22_1$, $22_3$ and flux bridge 36 which passes through air gap $44_1$ to the body of ring 12' where it passes circumferentially around ring 12' as shown in FIG. 6, returning to segment $22_1$ at a diametrically opposite region in air gap $44_1$.

Also as shown in FIG. 6, an identical flux path 55' is followed across lower segments $26_1$ and $26_3$ and flux bridge 38 due to equal currents flowing in coils $43_1$ and $43_3$, crossing air gap $44_2$ circumferentially around ring 12' in the same direction as 55 and entering stator segment $26_1$ as before.

The upper and lower planar fluxes in flux paths 55 and 55' add to the permanent magnet flux 46 on one (right) crossing of the respective air gap and $44_1$ and $44_2$ and oppose (−) the permanent magnet flux on the other crossing, as indicated by outer + and − signs, with the direction of the net forces reversed in the two planes of the upper and lower stator segments. This produces a couple imposing a torque tending to rotate the ring 12' about the y axis. As shown, a counterclockwise rotation of the ring 12' would be produced.

Thus it can be seen that both radial forces and rotational torques can be produced and controlled on the ring 12' with respect to the stator. Identical action is obtained when similar flux coils are mounted perpendicular to the x axis on stator segments $22_2$, $22_4$ and $26_2$, $26_4$ and are appropriately energized providing forces along the y axis and torques around the x axis.

In all of the embodiments disclosed above, the annular ring is constrained passively in the z axis direction due to its seeking to maintain a position of minimum reluctance to the DC flux provided by permanent magnets and all of the above actions are independent of the angular position of the ring about the z axis due to symmetry. Therefore control of four degrees of freedom of a rotating body is achieved with a non-contacting means of suspension.

Figure 7:
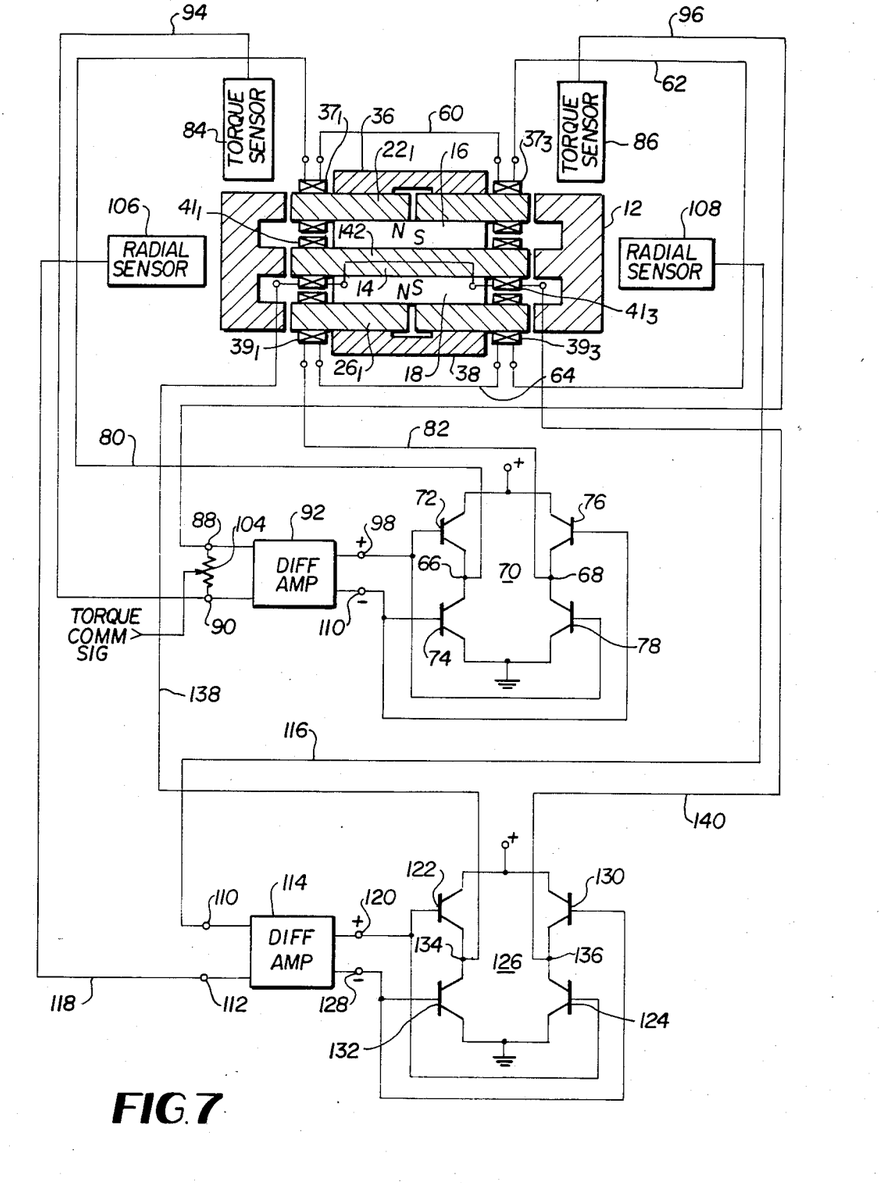
FIG. 7 is an electrical schematic diagram of a typical circuit which can be utilized for controlling both the radial forces and torquing moments of the suspended member in the embodiment disclosed in FIG. 4.

A typical example of circuitry for energizing flux coils in accordance with this invention is shown in FIG. 7 and comprises the circuitry for the embodiment shown in FIG. 4. This embodiment is shown because it lends itself to a relatively simple explanation involving a feedback type of control circuit. As illustrated in FIG. 7, the upper and lower pairs of torque producing flux coils $37_1$, $37_3$ and $39_1$, $39_3$ are connected in series via circuit leads 60, 62 and 64, where they are then connected across a pair of opposing terminals 66, 68 of a transistor bridge 70 comprised of transistors 72, 74, 76 and 78. The connection between coil $37_1$ to terminal 66 is made by means of circuit lead 80 while the connection from coil $39_1$ to terminal 68 is made by circuit lead 82.

A pair of angular displacement feedback sensors 84 and 86, which may be, for example, like those disclosed in U.S. Pat. No. 4,000,929, are positioned diametrically opposed to one another along the x axis adjacent the suspended ring 12. The sensors 84 and 86 respond to any angular orientation of the rotor 12 about the y axis to generate electrical signals which are applied to the two inputs 88 and 90 of a differential amplifier 92 by means of circuit leads 94 and 96. The differential amplifier 92 includes a pair of output terminals 98 and 100 which produce positive and negative going signals respectively which are coupled to opposite transistors i.e. transistors 72, 78 and 74, 76 of the bridge 70, wherein controllable currents in either direction are fed to the coils $37_1$, $37_3$ and $39_1$, $39_3$. This will cause magnetic flux to circulate across the upper stator segments $22_1$, 36 and $22_3$ down through the rotor 12 across the lower stator segments $26_3$, 38, $26_1$ returning via the opposite portion of the ring 12. This flux interacting with the DC flux provided by permanent magnets 16 and 18 will generate torques on the ring 12 about the y axis as described above.

An external torque command electrical signal for torquing the ring 12 can be applied to the differential amplifier, for example, by means of a potentiometer 104 coupled across the input terminals 88 and 90. The sensors 84 and 86 operate in absence of torque command signals to maintain position of the ring 12 in equilibrium about the y axis; however, when a torque command signal is applied to the differential amplifier 92, a torquing moment will be generated, causing the ring 12 to rotate about the y axis in one direction or the other depending upon the polarity of the torque command signal applied. An identical circuit configuration as shown in FIG. 7 would be utilized for producing torques about the x axis.

However, in order to provide the magnetic flux between the stator 10 and ring 12 for producing radial forces in combination with the permanent magnets 17 and 18, a pair of radial feedback sensors 106 and 108 are shown positioned diametrically across from one another along the x axis, in FIG. 7 where they couple into the inputs 110 and 112 of a second differential amplifier 114 by circuit leads 116 and 118. The positive going output 120 of the differential amplifier is coupled to opposing transistors 122 and 124 of a second transistor bridge 126, while the negative going output 128 is coupled across opposing transistors 130 and 132. The bridge terminals 134 and 136 accordingly are coupled across the two inner flux producing windings $41_1$ and $41_3$ via circuit leads 138 and 140. The two windings $41_1$ and $41_3$ are internally connected by means of circuit lead 142. Modulation of the magnetic flux in the central air gaps with return paths through the upper and lower gaps is thus provided and magnetic flux traversing these paths will produce increased force in the three air gaps on one side of the z axis and decremental forces on the other side. These forces are used to maintain the gaps equal by means of the two sensors 106 and 108. Similar circuitry suitably modified would be used for the embodiment shown in FIG. 5.

Thus what has been shown and described are means for adjusting or otherwise accurately controlling the angular orientation of a suspended element such as an annular ring in a magnetic bearing in the presence of static and/or dynamic disturbances.

Having thus shown and described what is at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

I claim:

1. An active magnetic bearing system for producing both radial and torsional forces on a suspended body, comprising:

an inner generally circular stator member having a plurality of peripheral outer surfaces defining a set of curvilinear exterior pole faces;

an outer annular magnetically permeable ring member coaxial with said stator member about a longitudinal axis and having a like plurality of inwardly projecting rims including surfaces defining a like set of curvilinear interior pole faces disposed opposite said set of exterior pole faces of said stator member and being separated therefrom by respective circumferential air gaps;

said stator member further being comprised of at least one permanent magnet member lying in a plane perpendicular to said longitudinal axis and providing a substantially uniform DC magnetic flux across said circumferential air gaps, a first and second set of segmented magnetically permeable members respectively located on opposite sides of said at least one permanent magnet member and including means for magnetically coupling pairs of segments of the same set diametrically to direct flux across said air gaps along first and second mutually orthogonal axes perpendicular to said longitudinal axis, flux coil means selectively energized to produce a first variable magnetic control flux alono predetermined radial paths which interacts with said DC magnetic flux to modulate radial forces across said circumferential air gaps for providing active radial stabilization of ring member about said longitudinal axis and flux coil means selectively energized to produce a second variable magnetic control flux which differentially interacts with said DC magnetic flux across said circumferential air gaps to generate torsional forces of said ring member about said first and second orthogonal axis.

2. The magnetic bearing system of claim 1 and further comprising sensor means located in relative close proximity to said ring member for sensing radial displacement of said ring member from said longitudinal axis along said first and second orthogonal axes and for sensing angular displacement of said ring about said first and second orthogonal axes and electrical circuit means coupled between said sensor means and said flux coil means for energizing said coil means.

3. The magnetic bearing system of claim 1 wherein said at least one permanent magnet member comprises at least one disc magnet centered on said longitudinal axis and wherein said first and second set of segmented members, comprise mutually separated quadrants of first and second magnetically permeable discs centered on said longitudinal axis.

4. The magnetic bearing system of claim 3 wherein said means for coupling flux between pairs of segments comprises first and second magnetically permeable members respectively covering at least a portion of first and second sets of disc quadrants.

5. The magnetic bearing system of claim 4 wherein said first and second magnetically permeable members comprises respective disc members contacting the outer surface of first and second sets of disc quadrants.

6. The magnetic bearing system of claim 3 wherein said flux coil means energized to produce said first and second variable magnetic flux comprises first and second sets of coil windings located on said disc quadrants.

7. The magnetic bearing system of claim 3 wherein said first and second sets of disc quadrants provide two curvilinear interior pole faces and said ring member includes two inwardly projecting rims providing two curvilinear exterior pole faces separated therefrom by two circumferential air gaps.

8. The magnetic bearing system of claim 1 wherein said at least one permanent magnet member comprises a pair of magnetically opposed permanent magnets and additionally including a magnetically permeable member located between said pair of permanent magnets wherein said first set of segmented magnetically permeable members are located on the outside surface of one of said pair of magnets; and wherein said second set of segmented magnetically permeable members are located on the outside surface of the other of said pair of magnets.

9. The magnetic bearing system of claim 8 wherein said magnetically permeable member between said pair of permanent magnets comprises a generally flat circular plate member having a peripheral outer surface defining one of said plurality of exterior pole faces, wherein the peripheral outer surface of said first and second sets of segmented permeable members define two more of said plurality of exterior pole faces, providing three exterior pole faces thereby, and wherein said ring member has three inwardly projecting rims defining three interior pole faces, whereby a structure having three circumferential air gaps is provided.

10. The magnetic bearing system of claim 9 wherein said first and second set of segmented magnetically permeable members comprise quadrants of a generally circular ferrous disc and wherein the vertices of said quadrants are directed toward said longitudinal axis.

11. The magnetic bearing system of claim 10 and wherein said flux coil means comprises respective winding means located on each of said disc quadrants.

12. The magnetic bearing system of claim 11 wherein each said disc quadrant includes an outwardly projecting magnetically permeable core member and wherein said respective coil winding means is wound on said core member.

13. The magnetic bearing system of claim 12 and wherein said means for magnetically coupling pairs of segments comprises a first and second magnetically permeable flux bridge member respectively located across and in contact with the top of the core members of said first and second sets of disc quadrants.

14. The magnetic bearing system of claim 13 wherein mutually opposing upper and lower coil winding means of said first and second sets are energized in opposition for producing a unidirectional control flux which interacts with said DC magnetic flux for producing differential forces for selectively producing said torsional forces.

15. The magnetic bearing system of claim 10 wherein said means for magnetic coupling said segments comprises a first and second magnetically permeable disc member affixed respectively to the top surface of said first and second set of disc quadrants, and wherein said coil winding means includes a respective coil winding located on the surface of each of said disc quadrants for producing said second variable control flux and a set coil winding located on magnetically permeable members between said pair of permanent magnets for producing said first variable control flux.

16. An active magnetic bearing system for producing both radial and torsional forces comprising:
an inner generally circular stator member having a plurality of peripheral outer surfaces defining a set of curvilinear exterior pole faces;
an outer annular magnetic permeable ring assembly coaxial with said stator member about a longitudinal axis, said ring assembly having a like plurality of inwardly projecting rims separated by rings of permanent magnets which are mutually magnetically opposed to one another, said rims having surfaces defining a set of curvilinear interior pole faces disposed opposite said set of exterior pole faces and being separated therefrom by respective circumferential air gaps;

said stator member being further comprised of a central magnetically permeable disc member having a pair of opposing faces lying in a plane perpendicular to said longitudinal axis, a pair of disc type permanent magnets located on said opposing faces and being oriented so that their magnetic polarities are mutually opposed, a first and second set of magnetically permeable disc segments respectively located on the outer surface of said permanent magnets and including means for magnetically coupling diametrically opposite segments to direct flux across said air gaps along first and second mutually orthogonal radial axes perpendicular to said longitudinal axes, said permanent magnets providing a substantially uniform radial DC flux across said circumferential air gaps which by itself provides axial stabilization of said ring member about said stator member, and coil winding means located on said disc segments and being selectively energizable to produce a first control flux which combines with said DC flux to radially stabilize said ring about said longitudinal axis and a second control flux which combines with said DC flux for producing differential forces across said circumferential air gaps to generate a torque of said ring member about said first and second orthogonal axes.

17. The magnetic bearing system of claim 16 wherein said first and second set of segmented magnetically permeable member comprise respective quadrants of a magnetically permeable disc, said quadrants being arranged so as to be in alignment with said first and second orthogonal axes and wherein the vertices thereof are convergent upon said longitudinal axis.

18. An active magnetic bearing, comprising:

an inner generally circular stator member having two peripheral outer surfaces defining curvilinear exterior pole faces;

an outer annular magnetically permeable ring member coaxial with said stator member about a longitudinal axis and having two inwardly projecting rims having surfaces defining a set of curvilinear interior pole faces disposed opposite said exterior pole faces of the stator member and being separated therefrom by a first and second circumferential air gap;

said stator member being further comprised of a central permanent magnet member providing a DC flux across said first and second air gaps and having a pair of opposing faces lying in a plane perpendicular to said longitudinal axis, a first and second set of segmented magnetically permeable disc members respectively located on said pair of opposing faces and including means for being magnetically coupled to direct flux across said first and second air gaps along first and second mutually orthogonal radial axes perpendicular to said longitudinal axis and coil winding means located on said stator member and being selectively energized to produce a first control flux for producing radial stabilizing forces of said ring member about said longitudinal axis when summed with said DC flux and to produce a second control flux to generate a torque of said ring member about said first and second orthogonal axis in a predetermined direction when summed with said DC flux.

19. The magnetic bearing of claim 18 wherein said first and second set of segmented magnetically permeable members comprise quadrants of a magnetically permeable disc arranged about said longitudinal axis and being centered about said first and second mutually orthogonal axes.

20. The magnetic bearing of claim 19 and wherein said coil winding means includes coil windings on each of said quadrants.

* * * * *